Feb. 25, 1941.  G. E. BRANN  2,233,073
CALCULATING DEVICE
Filed Sept. 12, 1939   3 Sheets-Sheet 1

Inventor:
George E. Brann,
by Frederic B. Schramm
His Attorney.

Feb. 25, 1941.  G. E. BRANN  2,233,073
CALCULATING DEVICE
Filed Sept. 12, 1939  3 Sheets-Sheet 3

Inventor:
George E. Brann,
by Frederic B. Schramm
His Attorney.

Patented Feb. 25, 1941

2,233,073

UNITED STATES PATENT OFFICE 2,233,073

CALCULATING DEVICE

George E. Brann, Schenectady, N. Y., assignor to Frederic B. Schramm, Schenectady, N. Y., as trustee Application September 12, 1939, Serial No. 294,413

8 Claims. (Cl. 235—89)

My invention relates to calculators and concerns particularly calculating devices in which scales are provided and distances along the scales are added or subtracted in the process of making mathematical calculations.

It is an object of my invention to provide an improved, easily used calculator which is relatively small and portable, being readily carried in the pocket, yet highly precise and having a degree of accuracy equalling large and expensive calculating machines that cannot be carried from place to place readily.

It is thus an object of my invention to provide a calculating device which is far more accurate than the usual portable calculators, or in other words which is comparable to using logarithm tables with a large number of places.

My invention has for its object the provision of a device which may be used for addition and subtraction, as well as highly precise multiplication and division and computations involving various mathematical functions.

Another object of my invention is to provide an indicator for use in multiple-scale calculating devices to indicate the location on the scales of factors entering a computation and to indicate the location of the result of the computation.

A further object of my invention is to provide a device having interchangeable scales for performing special calculations in which the interchangeability of the scales is without effect on the accuracy of operation.

Still another object of my invention is to provide apparatus in which no duplicate scales are required and in which no scales need be marked on the frame of the device.

Other and further objects and advantages will become apparent as the description proceeds.

In carrying out my invention in its preferred form I provide a slide or movable piece carrying a plurality of scales arranged parallel to one another, each having only a portion of the entire range of numerical values needed for the calculator, in such a manner that the precision with which calculations may be performed is enhanced by the number of scales, and the accuracy is thus proportional to the area of the slide, instead of merely to its linear length. There may be one or more sets of scales, and the scales in each set have a relationship between spacings of divisions representing the mathematical function required for computations to be made. The divisions have numerical values progressively related from one scale to the next, the divisions being spaced along the scales in accordance with the same mathematical formula in any one set of scales.

My invention will be understood more readily from the following detailed description when considered in connection with the accompanying drawings and those features of the invention which are believed to be novel and patentable will be pointed out in the claims appended hereto. In the drawings

Figure 3:
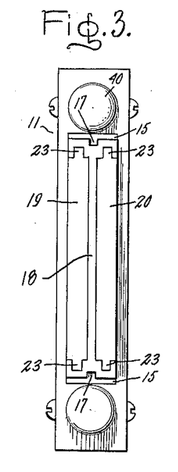
Figure 3 is an end view thereof.
Figure 4:
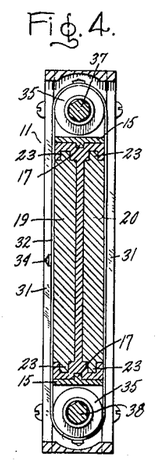
Figure 4 is a section taken on line 4—4 of Figure 1.

In the drawings I have illustrated a calculating device having a main frame designated generally by the reference numeral 11, a longitudinally movable or sliding scale-carrying member represented generally by the reference numeral 12, and a pair of transversely extending longitudinally movable carriages 13 and 14 slidably supported on the main frame 11. The main frame 11 consists of a pair of parallel spaced relatively rigid strips 15 joined by a pair of cross pieces 16 secured to the ends of the longitudinal strip 15. The cross pieces 16 have suitable openings to allow free movement of the slidable member 12. In order that the strips 15 may serve as guides for the movable scale-carrying member 12, tongues 17 are formed on the inner surfaces of the pieces 15 (see Figures 3 and 4).

The slidable scale-carrying member 12 comprises a slide holder 18 (Figures 3, 5 and 6), and one or more interchangeable and reversible scale-carrying slides 19 and 20. Additional slides carrying additional scales for special calculations may be provided and the arrangement is such that two reversible slides may be mounted in the device at any one time in order that scales on either face of any slide may be utilized with scales on either face of any other slide by mounting the two slides in question in the slide holder 18 with the desired scales on the exposed surfaces. The slide holder 18 is provided with grooves 21 fitting the guide tongues 17 in the main frame in order that the slide holder may be longitudinally slidably mounted in the main frame 11. Suitable means, such as grooves 22 in the slide holder 18 and tongues 23 in the slides 19 and 20 are provided for mounting the slides 19 and 20 in the slide holder 18. It will be understood, of course, that where relatively few different types of computations are to be made, one of the slides may be permanently mounted in the slide holder. Moreover, in case the computations to be performed are such that a single set of scales on one face of the slidable member 12 or sets of scales on the front and back faces are the only ones that need ever be employed, a single integral scale-carrying slide member may be provided with a suitable groove for cooperating with the tongues 17 of the main frame. As will be explained more in detail hereinafter, various sets of scales are provided on each of the surfaces of the slides 19 and 20 and the sets of scale are so chosen that any sets of scales which are to be used together in computations will be placed on surfaces of different slides in order that the two slides in question may be mounted in the slide holder 18 with the desired sets of scales exposed.

Figure 1:
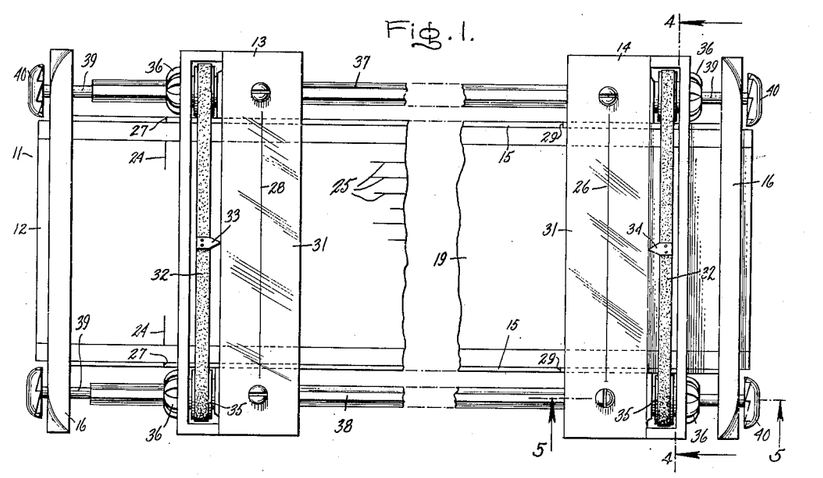
Figure 1 is a face view of one embodiment of my invention.
Figure 17:
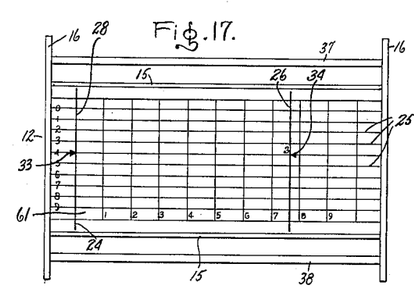
Figure 17 is a schematic diagram of the apparatus of Figure 1 illustrating the initial setting of the apparatus in making a computation.

The sets of scales are so arranged on the slides 19 and 20 that the scales in any set will extend between transverse index lines 24 near the ends of the slides (Figures 1 and 17). There are a number of parallel rows of divisions or scales 25 equally spaced transversely, forming a set of scales, marked upon each slide and the number of scales in each set depends upon the degree of precision desired, as will be explained hereinafter. For use in setting numerical values on the scales 25, a transverse cross line or hair line 26 is provided which is carried by the cursor or carriage 14. For use as a reference point in the calculations a transverse reference line is provided. Such a reference line may take the form of perpendicular lines 27 marked on portions of the main frame 11 near the end in such a manner that the left-hand index line 24 of the slide may be aligned with the reference line 27. Alternatively, the reference line may take the form of a hair line 28 carried by the cursor or left-hand carriage 13. If desired, the reference line 27 may be duplicated by similar marks 29 at the right-hand end of the main frame 11 so placed that the longitudinal distance between the marks 29 and 27 is the same as that between the transverse index lines 24 at the ends of the scale-carrying slide 19.

Figure 2:
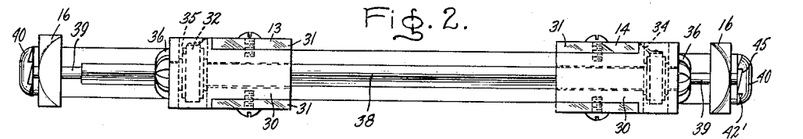
Figure 2 is a side view of the apparatus of Figure 1.

The carriages or cursors 13 and 14 may be similar, each comprising a frame 30 (Figure 2) of suitable construction to be mounted for longitudinal movement slidably along the guide strips 15 of the main frame 11 and a pair of glass pieces 31 upon which hair lines, such as the hair lines 26 and 28 may be marked. The carriages 13 and 14 also carry scale-indicating means consisting of endless belts 32, indicators 33 carried by one of the belts 32, indicators 34 carried by the other of the belts 32, pulleys 35 nearly hidden from view, mounted in the ends of the carriage frames and carrying the belts 32, and thumb wheels or operating wheels 36, each secured to one of the pulleys 35. The belts 32 may be composed of any suitable flexible material, such as rubber composition, for example, and may be mounted taut so as not to slip on the pulleys 35.

For the purpose of not only indicating on which one of the parallel scales of the set or sets of scales 25 a quantity used in a computation is to be read but also correlating the scales in different sets of scales, the indicators 33 or 34 on either belt are arranged with the spacing between the indicators equal to the width of a set of scales and corresponding to the transverse spacing between the sets of scales. For example, if there are 10 parallel scales in the set of scales 25, the spacing between the indicators 33 and likewise between the indicators 34 will be 10 times the transverse spacing between the individual scales in the set of scales 25. Furthermore indicators such as the indicators 33 and 34 are provided also on the portions of the belts, invisible in Figure 1, in such a manner that as the belts 32 are rotated there will always be one of the indicators opposite one of the scales of the set 25 and as one of the indicators leaves the lowermost scale the next indicator will enter the position of the uppermost scale or vice versa. The sets of scales on the front and back of the slidably movable member 12, i. e., on the exposed faces of the slides 19 and 20, are positioned in the same transverse relation. For example, when one of the indicators on one of the belts is opposite the zero or top scale of the set of scales 25 on the slide 20, another indicator on the same belt at the back of the device will be aligned with the zero or top scale of a correlated set of scales on the exposed surface of the slide 19. It will be understood, of course, that the opening in the carriage frames 30 through which the belts 32 pass are of such size as to permit the indicators 33 and 34 to pass freely.

For causing the indicator belts 32 to travel in unison when desired, the shafts 37 and 38 are provided which are mounted rotatably in the ends of the cross bars 16 so as to extend longitudinally along the sides of the main frame 11. A suitable disengageable mechanism is provided between one or both of the shafts 37 and 38 and the pulleys 35. For example, the shafts 37 and 38 may be made non-circular in cross-section and hubs with corresponding non-circular openings fitting axially loosely on the shafts 37 and 38 may be provided, each such hub carrying one of the pulleys 35 and the adjacent operating thumb wheel 36. One or both ends of the shafts 37 and 38 are made of small cross-section, preferably circular, as represented at 39, in order that when the carriages 13 and 14 are moved completely to the ends of the main frame 11 there will be no engagement between the shafts and the indicator-operating thumb wheels and pulleys 36 and 35. Preferably, the main frame 11 is made long enough in relation to the lengths of the scales 25 and the distance between the reference lines 27 and 29, that each of the cross hairs 28 and 26 may be moved beyond the reference lines 27 and 29 before leaving the operating or non-circular portions of the shafts 37 and 38 and entering the smaller or disengaging portions 39 of the shafts. In other words, if the slidably movable member 12 is so spaced as to bring the ends of the scales or indices 24 in alignment with the reference lines 27 and 29, the cross hairs 28 and 26 may be moved off the scales before the thumb wheels 36 reach the non-operating portions of the shafts 37 and 38.

In order that the positions of the indicators 33 and 34 may be separately readjusted so as to come opposite any one of the scales of the set of scales 25, the engaging and disengaging means between the belt carrying pulleys 35 and the shafts 37 and 38 is made such that the relative angular positions of these pulleys and the shafts may be reset in increments corresponding to the transverse distances between scales of the set of scales 25. If more positive action and definite positioning of the indicators 33 and 34 is desired, the shafts 37 and 38 may be formed with a plurality of flat sides so as to form a regular polygon or may be formed with a plurality of grooves, and the openings of the hubs of the thumb wheels 36 may have conforming shapes or keys to fit the flat sides or the grooves of the shafts 37 and 38, and there will be a predetermined number of definite relative angular positions. For example, in case the set of scales 25 consisted of 10 scales, the shafts would be designed to have 10 uniformly spaced relative angular positions with respect to the pulleys 35 and if there were 5 scales in the set of scales 25 there would be 5 different relative angular positions, etc.

Figure 5:
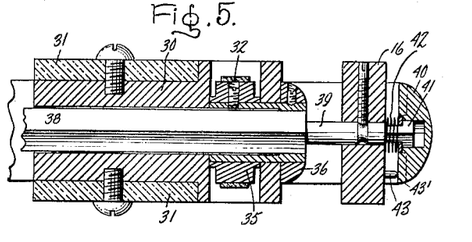
Figure 5 is a section taken on line 5—5 of Figure 1.
Figure 6:
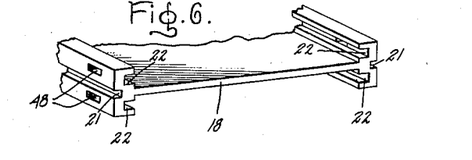
Figure 6 is a fragmentary view in perspective of the slide holder used in the apparatus of Figures 1 to 5.
Figures 7, 8, 9, 10, 11, 12, 13, 14, 15, 16:
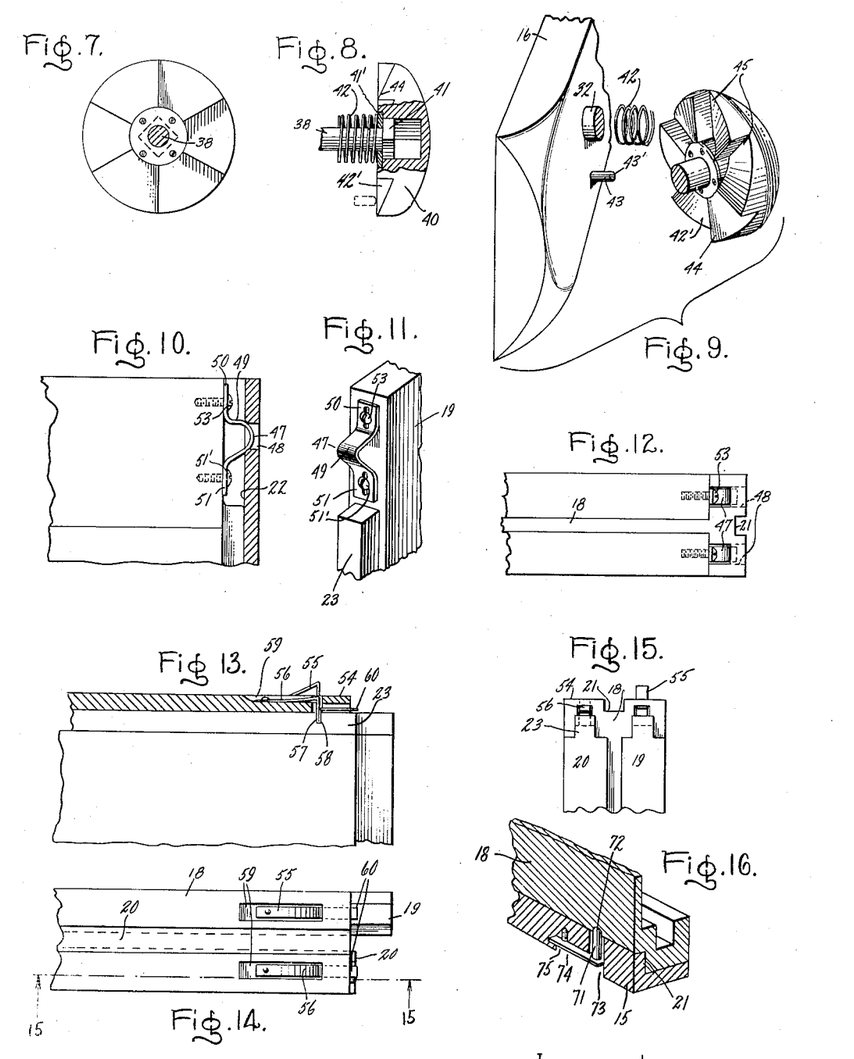
Figure 7 is a front view of one of the knobs used in mechanism for stepping up the indicators of the apparatus.
Figure 8 is a side view of the same.
Figure 9 is an exploded perspective view of the apparatus represented in Figures 5, 8 and 9.
Figure 10 is a fragmentary view partially in section showing the arrangement for locking the slide in place in the slide holder of Figure 6.
Figure 11 is a fragmentary detail view in perspective showing the end of one edge of the slide used in the apparatus of Figures 1 to 5.
Figure 12 is a fragmentary detail end view of the portion of the apparatus shown in Figures 10 and 11.
Figure 13 is a fragmentary side view showing a portion of the end of a modified form of slide holder and slide having a modified arrangement for locking the slide.
Figure 14 is a fragmentary edge view of the slide holder represented in Figure 13.
Figure 15 is a fragmentary end view of the apparatus of Figures 13 and 14.
Figure 16 is a fragmentary sectional perspective view of an arrangement which may be used for yieldingly holding the slide holder in a normal or starting position in the main frame.

For operating the indicators 33 and 34 when the carriages 13 and 14 are in the operating portions of the shafts 37 and 38, knobs or adjusters 40 may be provided at the ends of the shafts 37 and 38. In order to move the indicators 33 and 34 one position at a time, that is, the transverse distance between scales of the set of scales 25, step-up mechanisms may be provided which may take any desired form and may be arranged to move the indicators in one direction or the other in accordance with the direction in which the step-up mechanism is operated. Such step-up mechanisms may take the form of cam and detent means concealed under the knobs 40 at the ends of the shaft 38, for example. In Figures 7, 8 and 9 the inner surface of the knob 40 at the right-hand end of the shaft 38 is shown in greater detail. It is so mounted upon the shaft 38 as to have a slight axial movement with respect thereto, but to be constrained to rotate therewith, for example, by providing a square end 41 on the shaft 38 and a corresponding square opening in the inner portion of the knob 40. A spring 42 is provided to bias the knob 40 away from the adjacent surface of the cross bars 16 and there is a suitable means such as a washer 41' secured to the knob 40 for preventing the knob 40 from falling off the end of the shaft 38. The surface of the inner portion of the knob 40 adjacent the cross bars 16 is cut to form ratchet teeth 42', and a pin 43, shown in Figures 5 and 9, is provided on the cross bars 16 to cooperate with the ratchet teeth 42'. The pin 43 has an outer end 43' against which the high part 44 of any of the teeth 42' is adapted to abut when the carriages 13 and 14 are in the operating portion of the shaft 38, and the indicators 33 and 34 are opposite one of the parallel scales of the set of scales 25. Pressing the knob 40 against the teeth 42' accordingly causes the knob 40 to rotate in order that the sloping surface of the ratchet teeth 42' may ride along the end 43' of the pin 43. It will be understood that the number of ratchet teeth 42' corresponds to the number of scales in the set of scales 25 so that the indicators 33 and 34 may be advanced transversely the distance from one scale to the next by pressing the knob 40, assuming that the diameter of the pulleys 35 is such that the indicators 33 and 34 are moved from one scale to the next by the angular rotation of the pulleys through an angle equalling the angular space of the ratchet teeth 42'. However, any convenient number of ratchet teeth 42' may be used if the diameter of the pulleys 35 is selected accordingly. The opposite knob 40 at the left-hand end of the shaft 38 is similarly constructed and causes the shaft 38 to rotate in the opposite direction when the left-hand knob 40 is pressed. Since the indicators are usually operated by rotation of the thumb wheels 36 or the adjusting knobs 40, the ratchets 42' will invariably be in the proper position with one of the high points 44 abutting the end of the pin 43 whenever it becomes necessary to advance or retard the indicators by pressing either of the knobs 40. However, if desired, the pins 43 may be pivotally mounted on the cross bars 16 and resiliently biased so as to move over to the next high portion of the ratchet teeth 42' whenever the knob 40 is released after pressing it in, and causing the sloping surface of the ratchet 42' to ride along the pin 43 to the low point 45 of the ratchet.

In order that the scale-carrying slides 19 and 20 may be removably secured in the slide holder 18 with their index lines 24 in accurate alignment with each other and with the continuations of the index line which may be drawn on the slide holder 18, suitable snap catches may be employed, such as illustrated, for example, in Figures 10, 11 and 12. Either the tongues 23 may be omitted entirely and catches may be provided at both ends of the slides or the tongues may be cut away at one end as shown in Figures 11 and 12. To cooperate with the spring catches 47, openings 48 may be provided in the bottoms of the grooves 22 in the slide holder 18, as shown in Figure 10. The spring catches 47 may be in the form of spring strips bent to form projecting members 49 adapted to fit in the openings 48 and flat portions 50 and 51 adapted to be fastened to the edges of the slides 19 or 20. The projections 49 normally extend beyond the tongues 23, in order to snap into the openings 48. A notch may be cut in the edge of the slide 19 or 20 to permit the spring catches 47 to give before reaching the openings 48 when the slide is inserted in the grooves 22. One end, such as the end 51 of the spring catch 47 may also be so mounted as to slide, by means of an elongated slot cooperating with a screw head 51', not completely tightened down, for the sake of enhancing the resiliency of the spring catches 47. The other end 50, however, is rigidly secured in order to maintain the alignment of the left-hand index line 24 with respect to the slide holder 18. However, if desired, an adjusting screw 53 may be provided in order to permit adjustment in the ordinarily fixed mounting position of the end 50 for the sake of correcting inaccuracies discovered in the longitudinal alignment of the slide 19 with respect to the slide holder 18.

If desired, the means locking the slides 19 and 20 in the slide holder 18 may be so arranged as to prevent operation of the calculating device until the slides have been moved to their properly aligned positions. For example, as illustrated in Figures 13, 14 and 15 the spring catches may be mounted on the slide holder 18 instead of on the slides 19 and 20 and may be arranged to project from the outside edges 54 of the slide holder 18, thus restricting movement thereof inside the guide strips 15 whenever the slides are mounted in the slide holder 18 out of their correct aligned position. In the arrangement of Figures 13, 14 and 15 the spring catches consist of a pair of leaf springs 55 and 56, one for each of the two slides, and have transverse inwardly projecting tips 57. Cooperating with the tips 57, notches 58 are cut into the edges of the tongues 23 of the slides 19 and 20. In Figure 13 a portion of the slide and the slide holder are shown partially in section as if cut by the plane 15—15, shown in Figure 14. The spring catch 55 is shown in the projecting position produced when the slide 19 is mounted in the slide holder 18, but is not properly aligned so that the tip 57 cannot drop into the slot 58. It will be seen that a portion of the spring 56 projects beyond the edge 54 of the slide holder 18 so that it would not be possible to insert the slide holder 18 from the end shown into the main frame 11, or to slide it throughout its range of operation, if inserted from the other end. It will be understood that the leaf springs 55 and 56 are secured in suitable grooves 59 in the edges of the slide holder 18 so that there will be no interference with the operation of the slide holder 18 when the slides are in the aligned position and the springs 55 and 56 have dropped to the low position in which the spring 55 is illustrated in Figure 13. In order to lift the springs 55 and 56 for removal from the slides 19 and 20 when they are to be replaced or mounted in inverted position, projecting tips 60 may be provided.

For performing the operations of addition and subtraction and for indicating logarithms of numbers, one or more scales with evenly divided graduations may be marked on the slides, such as the slide 19, as shown at 61 in Figure 17. For performing the operations of multiplication and division, however, which constitute the majority of computations which are to be performed, a set of logarithmically divided scales 25 is provided on one face of one of the slides, such as the slide 19. Numerical values on the scales are related from one scale to the next and are arranged with all the scales of the set together covering a range of values from 1 to 10, each scale covering a range represented by the ratio $n$th root of 10, where $n$ is the number of scales in a set. For example, if there are five scales in the set of scales 25, the first scale is graduated from one to the fifth root of ten, the second scale from the fifth root of ten to the square of the fifth root of ten, the third from the square of the fifth root of ten to the third power of the fifth root of ten, the fourth from the third power of the fifth root of ten to the fourth power of the fifth root of ten, and the fifth from the fourth power of the fifth root of ten to the fifth power of the fifth root of ten, i. e., to 10. Similarly if there are 10 scales, the top scale, numbered zero is graduated with numerical values from one to the tenth root of 10 and so on, each time having the end value opposite the right-hand index 24 increased by the factor, tenth root of 10, so that the last scale is graduated from the ninth power of the tenth root of 10 to the tenth power of the tenth root of 10, i. e., to 10 itself. However, this end point is ordinarily marked "one" just as the beginning point at the left-hand end of the zero scale in the set.

For the sake of identification the scales are numbered, the upper scale being numbered zero and the other scales consecutively up to nine in the case of a set of scales comprising 10 scales. These identifying numbers are preferably marked at one or both ends of the slide as shown in Figure 17 and they may also be marked on the glass plates 31 on one or both of the carriages 13 and 14.

The apparatus illustrated in the drawings facilitates the utilization of scales such as my copyright scales shown in "Multiple or Folding Scale Logarithmic Charts" copyright 1939 by Geo. E. Brann, and described more in detail in that work. For performing other computations than multiplication and division other sets of scales may be provided. For example, on the back of the slide 19, a set of scales which I may call B scales may be provided comprising a set of five scales each logarithmically covering ⅕ the region from one to ten so that the values of the divisions are the squares of the corresponding values of the ten scale set, which I may call the A scales on the front face of the slide 20. The remaining half of the space on the back face of the slide 20 may consist of a set of ST scales graduated in accordance with the logarithms of sines or tangents of the small angles from approximately 34 minutes to approximately 5 degrees and 43 minutes, that is, from arc sine ¹⁄₁₀₀ to arc sine ₁₀. The first scale has graduations reaching from arc sine ¹⁄₁₀₀ to arc sine fifth root of ten times ¹⁄₁₀₀, the remaining scales continue as previously described in connection with a five-part set of scales. It will be understood that the values of sines or tangents of these small angles will be read on the corresponding B scale. The scales in the B and ST sets are numbered consecutively from 0 to 4, inclusive, for identification and correlation.

For indicating sines and tangents of larger angles the second slide 20 may have marked on one face thereof, two five-part sets of scales so arranged that they may be read with the five scales on the B set of scales. The sine scales would be logarithmically graduated in angles from approximately 5 degrees and 43 minutes to 90 degrees, and the tangent scale from 5 degrees, 43 minutes to 45 degrees. The other face of the second slide 20 could be covered with two sets of five part log-log scales to be read with the five-part set of scales B.

An additional slide may be provided having a 10-part set of folded or pi scales on one side and a 10-part set of reciprocal scales on the other side, either to be read with the A set of scales or set 25 described as being marked on the front face of the slide 19. It will be understood, of course, that other sets of scales calibrated in accordance with other mathematical functions or for performing special computations may be provided and these will be interchangeable with the scales described.

The method of performing the operations of addition and subtraction will be explained with reference to Figures 1 and 17, on an evenly divided scale, such as the scale 61, marked on the slide 19. The scale 61 is assumed to be graduated with numerical values from zero to ten, the zero and ten points being in alignment with the left-hand and right-hand index lines 24, respectively, of the scale. Numbers are added or subtracted by adding or subtracting the distances along the scale 61 represented by the numbers to be used in the computation. These distances may be added by setting the carriages 13 and 14 so that one hair line is on the beginning index, that is the index line 24 of the slide 19, and the other hair line is at the point in the scale 61 corresponding to the first number to be used in the computation. The left-hand hair line is left in the fixed position until the entire computation is completed. The slide 19, however, is moved until its left-hand index line 24 is under the hair line 26 whereupon the hair line 26 is moved until line 26 crosses the position on the scale 61 corresponding to the second member to be used in the computation. The slide 19 is then moved to the position in which the left-hand index line 24 is under the left-hand hair line 28 and the sum may be read on the scale 61 under the right-hand hair line 26. Subtraction may be performed by reversing the process, and more than two numbers may be added as will readily suggest itself to those skilled in the art. Where the values are such that the slide 19 extends too far to the right of the main frame 11 to permit the right-hand hair line 26 to be moved to the proper position, it will, of course, be necessary to use the right-hand index line 24 instead of the left-hand in making the alignment with the left-hand hair line 28 and to make allowance for the fact that this has been done by adding an extra ten to the sum obtained. Since the hair line 28 serving as a reference line has been kept in the fixed position throughout the computation, it is not necessary to utilize the left-hand carriage 13, and the reference line represented by the hair line 28 may be replaced by the reference line 27 marked on the frame of the device. For certain purposes, however, the use of a second carriage 13 and its hair line 28 has the advantage that the reference line may be at any desired position on the main frame and it is not necessary to bring the slide 19 to the fixed position on the main frame determined by the marks 27.

Inasmuch as multiplication and division may be performed by addition and subtraction of logarithms, the process of multiplying and dividing numbers may be performed in the same manner as explained above, utilizing a scale having the divisions spaced logarithmically with numerical values from one to ten, for example, which covers all possible numbers. In order to increase the accuracy of the computation, however, I provide the logarithmic graduated scales in multiple. For example, as shown in Figure 17, I may provide ten logarithmic scales numbered from zero to nine inclusive, each scale covering $1/10$ the range of logarithmically spaced numbers from one to ten. The first scale, for example, is graduated with numerical values from one to approximately 126, that is, the anti-log $1/10$; the second, No. 1 scale, having numerical values from approximately 126 to approximately 158, or anti-log $2/10$, etc. The number at the left-hand end of the scales is thus the first digit of the mantissa of the logarithm to the base ten, and the distance along the evenly divided scale 61 represents the remaining digits of the mantissa of the logarithm to the base ten. For example, the logarithm of three to the base ten is 4771. It is found accordingly that the numerical value of the graduation with the numerical value three is found in scale 4 representing the first digit of the mantissa, and that the distance from the left-hand index line 24 to the division for the numerical value three is $771/1000$ of the distance measured along the evenly divided scale 61. The values of logarithms are, of course, not used directly in the computation, but are mentioned in order to explain the manner in which the spacing of the divisions is determined on the scales. In the case of a set of logarithmic scales divided into ten scales, as in my device, each scale will represent the factor, tenth root of ten, and the values at the right-hand ends of the scales will be the successive powers of the tenth root of ten. It will be understood, of course, that these values are incommensurate and no actual numerical values will be placed at the ends of the scales, but instead the numerical values will be placed on the nearest divisions having commensurate numerical values. In view of the mathematical relationship between the scales, it will be seen also that any numerical value on one scale will come opposite the point on the next scale which bears a ratio to the first number of the $n$th root of ten, where $n$ is the number of scales in the set of scales, that is, the tenth root of ten in the arrangement illustrated in Figure 17. For example, the point opposite the three division in scale No. 3 will have a numerical value of three divided by the tenth root of ten and the point on scale No. 5 opposite the three division will have a numerical value of three multiplied by the tenth root of ten. The relationship between the scales may also be expressed mathematically by saying that the logarithms of the numerical values of the function (in terms of which the scales are graduated) assigned to points of the scales defined by any line parallel to the hair line 26 increases by an amount equalling $$\frac{\log_A F}{n}$$

from one scale to the next where F is an arbitrary value of the function, A is the arbitrary base and $n$ is the number of scales in the set of scales. In the case just illustrated the function is simply the linear progression of numbers from 1 to 10, the logarithms are to the base, $A=10$; the number of scales is $n=10$, and F is the maximum value of the function, i. e., 10. If the scales were calibrated in terms of sine of angles or any other function, however, the same relationship would exist between successive scales. It will be evident that a slide rule made with ten scales as illustrated and having a slide only ten inches long will have the accuracy of a 100-inch Mannheim rule, comparable in accuracy with the use of 5 or 6 place tables of logarithms.

Figure 18:
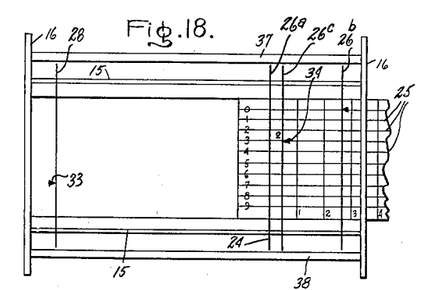
Figure 18 is a schematic diagram illustrating further settings in carrying out the process of multiplication.
Figure 19:
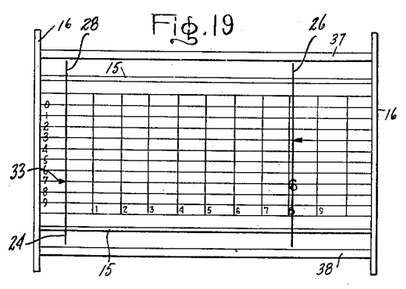
Figure 19 is a schematic diagram showing the setting of the apparatus giving the result of an illustrative computation.

In performing calculations utilizing the set of scales 25 one observes not only the longitudinal position of the reference line or cross hair along the slide 19, but also the transverse position, that is, the number of the scale on which the desired number is found. For example, if three is to be multiplied by two the operation is as follows: the slide 19 is placed with the left-hand index line 24 under the reference line 28, as shown in Figure 17, the carriage 14 is moved to bring the reference line 26 over the division marked three. To make it unnecessary to keep track of the number of scales traversed, the thumb wheel 36 is turned to bring the index 34 over the number 4 scale opposite the value three. It will be assumed that before the computation was commenced, the indices 33 and 34 had been placed opposite the zero scale. Accordingly, both indices 33 and 34 will now be over the No. 4 scale since with the carriages 13 and 14 in the positions shown they are over the operating portion of the shaft 38 and both indices move together. The next operation is illustrated in Figure 18; the slide 19 is moved to the right until its left-hand index line 24 comes under the hair line 26 of the carriage 14, as represented by the position 26ª in Figure 18. Then the carriage 14 is moved to the extreme right as represented by the hair line position b at which point the carriage has left the operating portion of the shaft 38 and the right-hand index 34 may be moved without affecting the left-hand index 33. The operating wheel 36 is then turned to bring the index 34 back to the zero scale. Thereupon the carriage 14 is moved to the left until its hair line 26 reaches the division having the numerical value two (represented by hair line position 26ᶜ). It will be observed that this numerical value was found on scale No. 3. Thereupon the operating wheel 36 is turned to bring the indicator 34 opposite the numeral two, thus on scale No. 3. In so doing the indicator 34 has traversed three scales and since the thumb wheel 36 is now in engagement with the shaft 38, the left-hand indicator 33 is moved from the former position shown in Figure 17, to the position over the scale 7, shown in Figures 18 and 19. Leaving the carriage 14 and the hair line 26 in the positions represented by 26ᶜ in Figure 18, the slide 19 is then restored to its original position (Figure 19) with its left-hand index line 24 under the stationary reference line 28 and the value of the product, 6, is read under the hair line 26 of the right-hand carriage 14, using the scale, namely scale No. 7, indicated by the position of the left-hand indicator 33. If additional factors are to be multiplied the same procedure is repeated until all of the factors have been used. The left-hand index 33 will in each case be advanced automatically a sufficient number of scales so as to indicate the proper scale on which to read the answer. In case the values should be such that the index 34 would go beyond the lowermost scale No. 9 another index would reappear at the upper end of the carriage 13 and point to that one of the scales on which the product was to be read.

Figure 20:
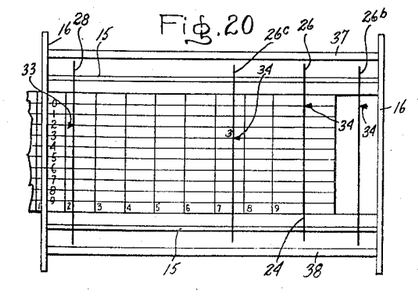
Figures 20 and 21 are schematic diagrams showing settings for another example of multiplication.
Figure 21:
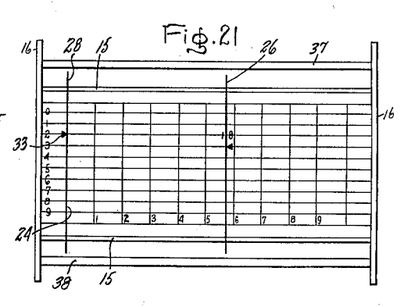

In case the values involved in the computation are such that the answer would be found at a point beyond the end of the main frame, it is necessary to set the slide with its right-hand index line 24 in alignment with the reference line 28 instead of with the left-hand index line in alignment, and to make allowance by adding one number to the scale on which the answer is read. To avoid error this is done by pressing the right-hand thumb wheel 40 operating the step-up mechanism so as to advance the indicators by one scale number. For example, if six is to be multiplied by three the initial setting would be with the slide 19 having its left-hand index 24 under the reference line 28, the left-hand indicator 33 being on scale 7 in which the value 6 is found. The carriage 14 is moved to the right-hand hair line position 26ᵇ shown in Figure 20 beyond the operating portion of the shaft 38 in order that the index 34 may be moved to the zero scale position, whereupon the carriage is moved back to the position shown in Figure 19 with the hair line 26 over the numeral six. Leaving the hair line 26 in the previous position, the slide 19 is then moved to the left (as shown in Figure 20) until its right-hand index line 24 comes under the hair line 26, whereupon the carriage 14 is moved to the hair line position 26ᶜ in which the hair line 26 comes over the numeral three which is found in the scale 4. Thereupon the operating wheel 36 is turned to bring the right-hand index 34 opposite the numeral three over scale 4 which adds 4 to the position of the left-hand index 33. Since the left-hand index 33 was already at scale 7 this would move the scale 36 to the hypothetical scale 11. Since during the operation, the right-hand index of the slide 19 was used, the knob 40 is pressed to advance the indicator to a hypothetical scale No. 12. However, another indicator 33 comes into view and moves to the position 2, as shown in Figure 20. Accordingly, the solution is to be read on scale No. 2. The next step involves realigning the left-hand index line 24 of the slide 19 with the reference line 28, as shown in Figure 21 whereupon the numeral 18 giving the result will be found under the hair line 26 in scale No. 2 to which the index 33 points.

Figure 22:
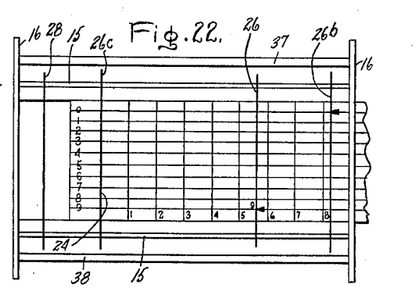
Figures 22 and 23 are schematic diagrams showing settings in an illustrative example of division performed by the apparatus. Like reference characters are utilized throughout the drawings to designate like parts.
Figure 23:
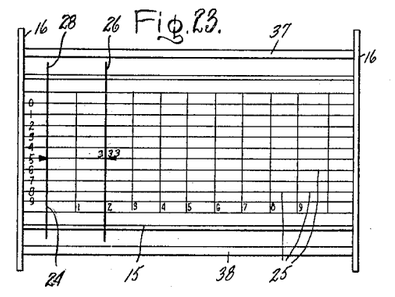

The successive positions for division have been illustrated in Figures 17, 22 and 23 where the operation to be performed is the division of three by nine. To perform the operation of division the operation previously described is carried out in reverse order. The carriage 14 is moved to the right-hand end (hair line position 26ᵇ) to free it from the operating portion of the shaft 38, the slide 19 is moved with its left-hand index 24 in alignment with the reference line 28, the adjusting knob 40 is turned to bring the index 33 to the scale on which the numeral 3 is to be found namely scale No. 4, whereas the index 34 is kept at the zero scale position. Thereupon the carriage 14 is moved to the position shown in Figure 17 with the cross line 26 over the division of numeral three; the slide 19 is moved to bring the division of numerical value 9 under the cross hair 26, as shown in Figure 22, the index operating wheel 36 is turned to bring the right-hand index 34 opposite the numerical value 9, that is in scale No. 9, which causes the left-hand index 33 to move from the original position over scale number 4 to the final position shown in Figure 23, to minus 5, or actually to scale No. 5. The number of the original indicator position 4, minus the nine scales traversed by the index 34 would mean moving the index 33 to the hypothetical position minus five or the equivalent ten minus five or scale No. 5. Thereupon the carriage is moved to the position 26ᶜ with the cross hair 26 aligned with the left-hand index line 24 of the slide 19. The slide 19 is then moved to the position shown in Figure 23 with the left-hand index line 24 under the reference line 28, and the value of the result is read under the cross hair 26, namely 3 3 3 3 . . . found on scale 5.

Since trigonometrical calculations involve the addition of the logarithms of numbers to the logarithms of sines and other trigonometrical functions of angles, the manner of performing trigonometrical calculations and other calculations will suggest itself to those skilled in the art for the reason that the various interchangeable scales may be placed in the scale holder 18 and are graduated in accordance with the logarithms of various functions, such as the logarithms of trigonometrical functions, logarithms of the logarithms of numbers, etc., according to the character of the computations to be performed.

In order to facilitate stopping the movable member 12 at the proper point whenever returning it to its original position and in order to make sure that the scale index line 24 will then be accurately aligned with the reference line 27 when the reference line 27 instead of the left-hand cross hair 28 is used for reference, I may provide a suitable form of resilient holding mechanism such as illustrated in Figure 16, for example. In this arrangement the slide holder 18 is recessed at one or both sides, for example, at diagonally opposite points on the sides near the ends, to cooperate with a ball latch. The ball latch consists of a pin 71 having a hemispherical tip 72 adapted to fit into the recess in the slide holder 18. The pin 71 is mounted axially movable in a transverse opening 73 in the side strip 15 of the main frame 11. For resiliently urging the pin tip 72 inward a strip spring 74 is provided and a groove 75 is cut into the piece 15 to receive the spring strip 74. One end of the spring strip 74 is joined to the outer end of the pin 71 and the other end of the spring strip is secured to the bottom of the groove 75 in the piece 15.

It will be apparent that the pin 71 will guide the slide holder into a definite position and hold it there whenever the slide holder is returned to this approximate position. However, the spherical shape of the pin tip 72 permits readily moving the slide holder 18 out of the original position for making calculations. If desired the fixed end of the spring strip 74 may be adjustably secured in the bottom of the groove 75 in order to make the position of the pin 71 in relation to the cooperating recess in the slide holder 18, precisely that in which the scale index line 24 and the reference line 27 on the main frame are in exact alignment. This adjustment when once made is, of course, not thereafter disturbed.

By the applicant's apparatus, multiplication may readily be performed with a single setting of the slide, notwithstanding the fact that only the slide carries scale divisions. For example, if one desires to multiply two numbers $a$ and $b$ with one setting of the slide and is using the line 28 as the reference line and the line 26 as the hair line he proceeds as follows: Starting with the end of the scale under the reference line 28 he sets the hair line 26 on the number $a$, moves the slide 19 to bring the number $b$ under the reference line 28 and reads the product under the hair line 26. For performing calculations in this manner, the reference line, in this case the line 28, need not be movable on the main frame provided the other cross line, i. e., the hair line 26, and the scale-carrying slide 19 are longitudinally movable with respect to the reference line 28. The cross lines 26 and 28 should, of course, extend across the slide 19 so as to intersect all of the scales to permit the multiplication of any two numbers.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A slide rule comprising a longitudinal main frame, a longitudinal slide holder supported longitudinally movable in said main frame, a pair of slides supported in said slide holder, and carrying sets of uniformly transversely spaced longitudinal scales on both sides, one of said slides being replaceable by a slide carrying scales calibrated in accordance with a different mathematical function, a pair of transverse carriage frames longitudinally movable on the main frame, said carriage frames carrying hair lines extending transversely across said slides, rotatably mounted pulleys at either end of the carriage frames, endless belts riding over said pulleys on each of said carriage frames so as to extend transversely around and across the slides, uniformly spaced indicators on the belts, the spacing therebetween equalling as many times the transverse spacing between scales on the slides as there are scales in a set, a pair of longitudinal rotatably mounted shafts supported by the main frame at the sides thereof, an adjusting knob at the end of one of said shafts, operating thumb wheels secured to one of the pulleys on each of the carriage frames, for each of said thumb wheels a hub carrying both the thumb wheel and the associated pulley and having a non-circular opening therein surrounding one of the shafts, the shaft surrounded by said hub having such a diameter at the end portion as not to engage said non-circular hub opening, but having a cross-section beyond said end portion of such shape as to engage said hub, and said cross-sectional shape being such that the shaft and hub have a number of relative positions of engagement equalling the number of scales in one of said sets of scales, and means for rotating the hub-carrying shaft in either direction the fraction of a revolution between relative positions of engagement of said shaft and said thumb wheel hub, said pulleys being of such diameter that rotation thereof through the aforesaid fraction of a revolution causes the indicators to travel a distance corresponding to the transverse spacing between scales, the scales in any set having divisions with numerical values progressively related from one scale to the next and having the divisions spaced along the scales in accordance with the same mathematical formula, the sets of scales having a relationship between spacings of divisions representing mathematical functions required for computations to be made, said slide holder including means for securing said slides in fixed relation to each other with their scales in alignment and restricting movement of said slide holder in the main frame when said slides are not in such position of alignment.

2. A universal calculator comprising a longitudinal main frame, a longitudinal slide holder supported longitudinally movable in said main frame, a pair of slides supported in said slide holder, and carrying sets of transversely spaced longitudinal scales, one of said slides being replaceable by a slide carrying scales calibrated in accordance with a different mathematical function, means on the main frame carrying a transverse reference line without scales, means carrying a hair line extending transversely across the slides, said line-carrying means being relatively movable longitudinally with respect to each other and with respect to the slide holder, the scales in either set having divisions with numerical values progressively related from one scale to the next and having divisions spaced along the scales in accordance with the same mathematical formula, the sets of scales having a relationship between spacings of divisions representing a mathematical function required for computations to be made, said slide holder including means for securing said slides in fixed relative position to each other with the scales in alignment.

3. A slide rule comprising a longitudinal main frame, a longitudinal slide holder supported longitudinally movable in said main frame, a pair of slides in said slide holder carrying longitudinal scales, one of the slides being replaceable by a slide carrying scales calibrated in accordance with a different mathematical function, the scales having a relationship between spacings of divisions representing a mathematical function required for computations to be made, said slide holder including means for securing said slides in fixed position in relation to each other with said scales in alignment and for restricting motion of the slide holder in the main frame whenever the replaceable slide is mounted out of its aligned position in the slide holder.

4. A calculator comprising a longitudinal main frame, a longitudinal slide supported longitudinally movable in said main frame and carrying sets of uniformly transversely spaced longitudinal scales, a pair of transverse carriage frames longitudinally movable on the main frame, said carriage frames carrying hair lines extending transversely across said slides, rotatably mounted pulleys at the ends of the carriage frames, endless belts riding over said pulleys on each of said carriage frames so as to extend transversely across the slides, uniformly spaced indicators on the belts, the spacing therebetween equalling as many times the transverse spacing between scales on the slide as there are scales in a set, the sets of scales being so positioned transversely that the indicators pass from scale to scale in unison in the sets of scales, a longitudinal rotatably mounted shaft supported by the main frame and extending along it, operating thumb wheels for each of the carriage frames secured to one of the pulleys therein, hubs for each of said thumb wheels each having a non-circular opening therein surrounding the shaft, said shaft having such a diameter at an end portion as not to engage said non-circular hub opening, but having a cross-section beyond said end portion of such shape as to engage said hubs, and said cross-sectional shape being such that the shaft and hub have a number of relative positions of engagement equalling the number of scales in each set, and means for rotating the hub-carrying shaft in either direction the fraction of a revolution between relative positions of engagement of said shafts and said thumb wheel hubs, said hub-connected pulleys being of such a diameter that rotation thereof through the aforesaid fraction of a revolution causes the indicators to travel a distance corresponding to the transverse spacing between scales, the scales in any set having divisions with numerical values progressively related from one scale to the next and having divisions spaced along the scales in accordance with the same mathematical formula.

5. A calculator comprising a longitudinal main frame, a longitudinal slide supported longitudinally on said main frame and carrying a set of uniformly transversely spaced longitudinal scales, a carriage frame longitudinally movable on the main frame and carrying a hair line extending transversely across said slide, means on the main frame carrying a transverse reference line, longitudinally movable with respect to said carriage frame and said slide, rotatably mounted pulleys at the ends of the carriage frame, an endless belt riding over said pulleys so as to extend transversely around and across the slide, uniformly spaced indicators on the belt with spacing therebetween equalling as many times the transverse spacing between scales on the slides as there are scales in the set, a longitudinal rotatably mounted shaft, a thumb wheel secured to one of the pulleys on said carriage frame, a hub therefor having a non-circular opening therein surrounding the shaft, said shaft having such a diameter at an end portion as not to engage said non-circular opening, but having a cross-section beyond said portion of such shape as to engage said hub, said cross-sectional shape being such that the shaft and hub have a number of relative positions of engagement equalling the number of scales in said set, and means for rotating said shaft the fraction of a revolution between relative positions of engagement of said shaft and said thumb wheel hub, said hub-connected pulley being of such a diameter that rotation thereof through the aforesaid fraction of a revolution causes the indicators to travel a distance corresponding to the transverse spacing between scales, the scales having divisions with numerical values progressively related from one scale to the next and having the divisions spaced along the scales in accordance with the same mathematical formula.

6. A calculator comprising a set of uniformly transversely spaced longitudinal scales having divisions with numerical values progressively related from one scale to the next and having divisions spaced along the scales in accordance with the same mathematical formula whereby a given quantity to be used in a computation is found on one of the scales, a transverse carriage frame longitudinally movable along the scale and carrying a cross-line extending transversely across the scales, rotatably mounted pulleys at the ends of said carriage frame, an endless belt riding over said pulleys so as to extend transversely around and across the scales, uniformly spaced indicators on the belts with spacings therebetween equalling as many times the transverse spacing between scales as there are scales in the set, a rotatably mounted shaft extending parallel to the scales, an operating thumb wheel secured to one of the pulleys and having disengageable means for engaging the shaft, said shaft having such a shape at a non-operating portion thereof as not to be engaged by said means, but having means at the operating portion thereof such as to be engaged with said thumb wheel.

7. In a slide rule, a set of transversely spaced longitudinal scales having divisions with numerical values progressively related from one scale to the next and having the divisions spaced along the scales in accordance with the same mathematical formula whereby a given quantity to be used in a computation is found on one of said scales, indicator means including a set of indices transversely movable across the scales, and means for advancing said indicator means in accordance with the number of scales traversed in finding the quantity for computation, the indices in the set being spaced a distance equal to the transverse distance across the set of scales.

8. In a slide rule, a set of transversely spaced scales having divisions with numerical values progressively related from one scale to the next and having the divisions spaced along the scales in accordance with the same mathematical formula whereby a given quantity to be used in a computation is found on one of said scales, indicator means, means for advancing said indicator means in accordance with the number of scales traversed in finding the quantity for computation, and step-action means for automatically moving said indicator means an amount corresponding to traversing from one scale to the next in response to each operation of the step-action means.

GEORGE E. BRANN.